(12) United States Patent
Grünler et al.

(10) Patent No.: US 8,277,554 B2
(45) Date of Patent: Oct. 2, 2012

(54) HOT-MELT ADHESIVE AND METHOD FOR THE MANUFACTURE THEREOF

(75) Inventors: Bernd Grünler, Zeulenroda (DE); Andreas Heft, Gera (DE); Marion Homuth, Jena (DE); Thomas Heinze, Jena (DE); Tim Liebert, Jena (DE)

(73) Assignees: Innovent e.V., Jena (DE); Friedrich-Schiller-Universitat, Jena (DE)

( * ) Notice: Subject to any disclaimer, the term of this patent is extended or adjusted under 35 U.S.C. 154(b) by 0 days.

(21) Appl. No.: 12/947,337

(22) Filed: Nov. 16, 2010

(65) Prior Publication Data
US 2011/0180760 A1    Jul. 28, 2011

Related U.S. Application Data

(63) Continuation of application No. PCT/EP2009/055873, filed on May 14, 2009.

(30) Foreign Application Priority Data

May 17, 2008    (DE) .......................... 10 2008 024 089

(51) Int. Cl.
 *C08L 3/06* (2006.01)
(52) U.S. Cl. ........... 106/207.1; 524/47; 524/48; 524/51; 524/54; 524/57; 536/58; 536/63; 536/69; 536/107; 536/110; 106/162.7
(58) Field of Classification Search ............. 252/301.34; 536/58, 63, 69, 107, 110; 106/162.7, 207.1; 524/47, 48, 51, 54, 57
See application file for complete search history.

(56) References Cited

U.S. PATENT DOCUMENTS

| | | | |
|---|---|---|---|
| 4,020,272 A * | 4/1977 | Tessler | 536/107 |
| 4,626,288 A * | 12/1986 | Trzasko et al. | 106/206.1 |
| 5,434,201 A | 7/1995 | Neigel et al. | |
| 5,498,224 A | 3/1996 | Kauffman et al. | |

FOREIGN PATENT DOCUMENTS

DE     1 593 152     7/1970
(Continued)

OTHER PUBLICATIONS

"Novel approach towards hydrolytically stable starch acetates for physiological applications". Liebert et al., Reactive & Functional Polymers, 68, 2008, 1-11.* Han et al., "Synthesis, and Anti-Hyperlipidemic Activity of a Novel Starch Piperinic Ester," *Carbohydrate Polymers; Applied Science Publishers*, 2007, pp. 441-447, vol. 71, No. 3.

(Continued)

*Primary Examiner* — Mark Kopec
*Assistant Examiner* — Haidung Nguyen
(74) *Attorney, Agent, or Firm* — Womble Carlyle Sandridge & Rice, LLP

(57) ABSTRACT

The invention relates to a hot melt adhesive, comprising at least one polysaccharide ester gained by a reaction of a polysaccharide with an imidazolide in melted imidazole. The invention relates, further, to a process for producing the hot melt adhesive, in which imidazole is melted, and an acid chloride and/or an acid anhydride and/or a lactone is reacted in and with the melted imidazole to form an imidazolide, whereby at least one polysaccharide is added to the melted imidazole, whereby the polysaccharide is reacted with the imidazolide to form a polysaccharide ester.

8 Claims, 1 Drawing Sheet

FOREIGN PATENT DOCUMENTS

| | | |
|---|---|---|
| DE | 2 230 884 | 1/1973 |
| DE | 693 17 635 | 7/1998 |
| DE | 199 54 960 | 6/2000 |
| DE | 102009022805 | * 12/2010 |
| EP | 0 705 895 | 4/1996 |
| GB | 2 291 333 | 1/1996 |
| WO | WO 2005/033243 | 4/2005 |

OTHER PUBLICATIONS

Neumann et al., "Synthesis of Hydrophobic Starch Esters by Reaction of Starch with Various Carboxylic Acid Imidazolides," *Starch/Staerke*, 2002, pp. 449-453, vol. 54, No. 10.

* cited by examiner

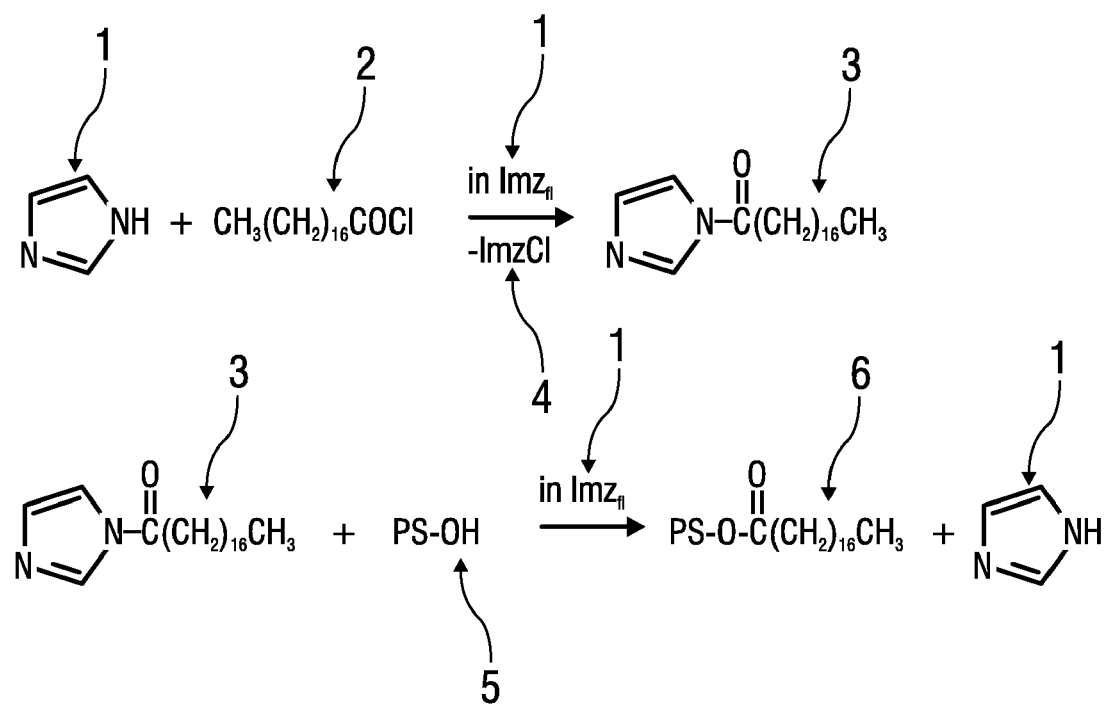

HOT-MELT ADHESIVE AND METHOD FOR THE MANUFACTURE THEREOF

CROSS-REFERENCE TO RELATED APPLICATIONS

This application is a continuation of international application number PCT/EP2009/055873 filed on May 14, 2009. The present disclosure claims priority to and the benefit of International Patent Application Number PCT/EP2009/055873, filed May 14, 2009 and German Patent Application Number 10 2008 024 089.3, filed May 17, 2008, both of which are incorporated by reference in their entirety and for all purposes.

BACKGROUND OF THE DISCLOSURE

1. Field of the Disclosure

The invention relates to a hot melt adhesive, and a process for producing it.

2. Description of Related Art

Hot melt adhesives are adhesives that are applied in warm or hot condition to parts that are to be bonded together. The parts are then joined together. When cooled, the hot melt adhesive solidifies, and that binds the parts together. When heat is again applied, the hot melt adhesive is again softened, so that the bonding of the parts can be unbound, or their position with respect to one another can be changed. Steadily rising crude oil prices, while at the same time the availability of crude oil is falling, has led to increasing costs in the production of hot melt adhesives of that kind, because their main components are petroleum products.

From U.S. Pat. No. 5,434,201 a process for producing a hot melt adhesive is known, which contains a starch ester with a substitution level of 0.3 to 3.0, and a selected non-volatile organic plasticizer, whereby the starch ester is a water-based system, with at least 40 weight % moisture. Hot melt adhesives of that kind tend to experience phase separations when they solidify. A transparent matrix cannot be attained in that way.

SUMMARY OF THE DISCLOSURE

The goal of the invention is to provide an improved hot melt adhesive, and an improved process for its manufacture.

A hot melt adhesive that is the subject of the invention encompasses at least one polysaccharide ester gained from the reaction of a polysaccharide with an imidazole, in melted imidazole. According to invention, a hot melt adhesive is produced using a process in which the imidazole is melted, and an acid chloride and/or an acid anhydride, and/or a lactone are reacted with an imidazolide. At least one polysaccharide is added to the melted imidazole. The polysaccharide is reacted with the imidazolide to form a polysaccharide ester. That procedure forms a transparent hot melt adhesive that remains transparent even after it solidifies. Glass parts, for example, can be bonded to one another, in a manner that is reconfigurable, using a thermo-plastic adhesive of that kind, without their optical transparency being adversely affected.

The hot melt adhesive that is the subject of the invention melts in a wide temperature range, homogenously, and produces a transparent melt, which, when heated, results in a fully optically transparent layer between the parts to be bonded together (e.g. glass).

The compounds (polysaccharide esters) gained in the process that is the subject of the invention are highly pure, i.e. they contain no by-products and/or have no flaws, as is the case with esters that are produced using other processes. That high degree of purity is the reason for the high transparency of the melts.

Polysaccharides and their derivatives are well suited for the production of specialty polymers, as they are available from renewable resources, are recyclable, highly modifiable, are biocompatible, and structure-forming.

The melted imidazole is used according to the invention, on the one hand, as a source medium and suspension medium for the polysaccharides, and is also intermediarily reacted with the acid chloride, acid anhydride, and/or lactone, to form imidazolides. The imidazolides ensure a very effective and uniform esterification of the polysaccharides. The melting point of the polysaccharide ester can be set by choosing a polymer backbone, a branching structure, substituents, and a functionalization level adjustment. The polymer backbone defines, for multiple sugars, the choice of the positions in the monosaccharides, on which those are bound to each other. The branching structure describes how the free positions of the basic structure of the monosaccharide are occupied, in the combination of monosaccharides with the same or other monosaccharides or oligosaccharides. The functionalization level is a measure of how many of those positions will be occupied with chemical groups or compounds (substituents). The selection of those parameters allows the optical transparency, viscosity of the melt, adhesive behavior, and suspension ability for embedded particles to be set, in addition to the softening temperature. A hot melt adhesive formed in that way can be repeatedly melted and solidified, without changing its mechanical and optical properties.

In a preferred embodiment of the invention, functionalized nanoparticles are added to the polysaccharides to modify at least one characteristic of the polysaccharide ester. The nanoparticles can be used to, for example, modify the color and/or the electrical conductivity of the polysaccharide ester. The electrical conductivity can be set up in such a way that, when an electrical charge is added, a power current is created that heats up the adhesive in such a way that it melts, so that the parts can be bonded to one another, or to unbind their bonds.

The nanoparticles can include permanent or switching photochromic dyes. Photochromic switching dyes change color when exposed to light.

In a particularly preferred embodiment of the process, the polysaccharide ester is isolated by washing it with isopropanol, in particular after the reaction mixture has cooled. The isopropanol is then removed, for example by heating it in a vacuum, and then washed with ethanolic sodium hydroxide solution, whereby the imidazole is regenerated. In that way, it again is available as a reaction medium.

According to the invention, at least one substance from the group: cellulose, scleroglucan, curdlan, xylan, pullulan, starch, and dextran is used as the polysaccharide. These substances can be suspended at temperatures higher than 90° C. (194° F.) in melted imidazole, and will exhibit no recognizable decomposition. In the resulting melts, the polysaccharides can be converted directly to the corresponding derivatives. Aromatic un-saturated and aliphatic esters, primarily fat acid esters (carbon acid esters with chain lengths of four to 18 carbon atoms), can then be attained. The imidazolide can be produced in situ, or in a separate reaction vessel. The regeneration of the imidazole is strongly promoted by the production of the reactive imidazolides directly in the melt, without isolation (in situ). Moreover, the effectiveness of the process increases due to the in-situ manufacture of the imidazolide.

The use of dextran produces dextran ester with melting points in the range of 40° C. to 70° C. (104° to 158° F.). Starch is used to create starch derivatives with melting points in the range of 160° C. to 280° C. (320° F. to 536° F.).

In a particularly preferred embodiment, the adhesive comprises exactly one polysaccharide ester, that is, exactly one polysaccharide is converted to one polysaccharide ester. In particular, the adhesive contains no volatile impurities, as those can interfere with homogeneous melting. In addition, volatile components in the adhesive can be released due to sunlight, whereby the stability of the composition would be endangered. For that reason, the hot-melt adhesive is preferably a single polymeric substance, and not a mixture or moist material, or otherwise impure material.

BRIEF DESCRIPTION OF THE SEVERAL VIEWS OF THE DRAWING(S)

Embodiments of the invention are described in what follows, using a drawing.

FIG. 1 illustrates reaction equations for the production of a hot melt adhesive.

DETAILED DESCRIPTION OF THE DISCLOSURE

FIG. 1 shows, as an example, two reaction equations. The reactions in the production of a hot melt adhesive are described. Imidazole 1 is melted, as part of that process. Then, an acid chloride 2 is added to the melted imidazole 1. That creates an imidazolide 3. Imidazolium chloride 4 is set free. A polysaccharide 5 is added to the melted imidazole 1 with the imidazolide 3. A polysaccharide ester 6 is thus created, while imidazole 1 is regenerated. As an example, a stearic acid chloride is used as acid chloride 2. Accordingly, polysaccharide ester 6 is a polysaccharide stearate. Other acid chlorides 2 can, however, also be used.

Instead of acid chloride 2, an acid anhydride and/or a lactone can be used.

In a further non-illustrated embodiment of the process for producing the hot melt adhesive, 45 g of imidazole 1 is melted at a temperature of 90° C. to 95° C. Five grams of potato starch is added as Polysaccharide 5, to the melted imidazole 1. The melt is kept at that temperature for approximately two hours. Then, a quantity of 93.6 ml of palmitoyl chloride is added, as acid chloride 2. After another 24 hours at the given temperature, the heat supply is stopped, so that the melt cools slowly. Then, 500 ml isopropanol is added. The resulting mixture is transferred to 1 liter of isopropanol. The product that was isolated in that manner is then washed three times with 200 ml isopropanol, and then dried in a vacuum 25 g of starch palmitate is thereby obtained, as polysaccharide ester 6. That results in a transparent melt at 160° C. (320° F.). Clear, colorless layers are poured from it, to form film.

Functionalized nanoparticles can be added to the polysaccharide ester 6, in order to modify at least one characteristic of polysaccharide ester 6. Those nanoparticles can be used to modify a color and/or electrical conductivity of the polysaccharide ester 6, for example. The electrical conductivity can be set up in such a way that when a voltage is added, a flow of current is created that heats up the adhesive in such a way that it melts, in order to reposition parts bound by the adhesive, or to loosen their bonds.

The nanoparticles can include permanent or switching photo-chromic dyes. Photochromic switching dyes change color when exposed to light.

In a non-illustrated embodiment of the invention, a coarse-grained thermo-plastic polysaccharide ester 6 with a melting point in the range of 90° C. to 120° C. (194° F. to 248° F.) was mixed, with 2% nanoparticles in the form of nanoscale aluminosilicate cages, with photochrome encapsulated switching dyes encapsulated in them, through a mechanical switching grinding/mixing process. Through the mixing process, homogenization of the nanoparticles in the now finely powdered matrix of polysaccharide esters 6 was attained. That mixture was placed between two glass plates, and melted under a heliotype of approximately $0.7*10^5$ Pa at a temperature of 95° C. (203° F.). By doing that, at normal temperatures, a firmly adherent glass composite was produced, that takes on a light blue coloration when exposed to intense sun rays. By again re-heating to above 90° C. (194° F.), the glass composite can again be unbonded, or the position of the glass plates with respect to each other can be changed. When the hot melt adhesive is again cooled off, its optical as well as its mechanical properties remain unchanged, with respect to the initially produced configuration.

At least one material from the group: cellulose, scleroglucan, curdlan, xylan, pullulan, starch, or dextran is used as polysaccharide 5, according to the invention.

Imidazolide 3 can be produced in situ, or in a separate reaction vessel.

In the represented example, instead of isopropanol, a different organic solvent can be used.

The invention claimed is:

1. Process for producing a hot meltable adhesive, comprising:
   melting imidazole; adding at least one polysaccharide to the melt imidazole, the at least one polysaccharide being selected from the group consisting of cellulose, scleroglucan, curdlan, xylan, pullulan, starch, and dextran; reacting an acid chloride and at least one of an acid anhydride and a lactone, in and with the melted imidazole, to form an imidazolide; and reacting the at least one polysaccharide with the imidazolide, to form a polysaccharide ester.

2. Process according to claim 1, further comprising adding functionalized nanoparticles are added, in order to modify at least one property of the hot melt adhesive.

3. Process according to claim 2, wherein the nanoparticles modify a color of the hot melt adhesive.

4. Process according to claim 3, wherein the nanoparticles are used with photochrome switching dyes.

5. Process according to claim 2, wherein the nanoparticles alter the electrical conductivity of the hot melt adhesive.

6. Process according to claim 5, wherein the conductivity is modified in such a way that the hot melt adhesive is capable of being heated and melted, by creating an electrical current.

7. Process according to claim 1, further comprising isolating the polysaccharide ester by washing with isopropanol, removing the isopropanol, and washing the polysaccharide ester with ethanolic sodium hydroxide solution to regenerate the imidazole.

8. Process according to claim 1, wherein exactly one polysaccharide is converted to exactly one polysaccharide ester.

\* \* \* \* \*